United States Patent [19]

Nowak

[11] Patent Number: 4,995,625
[45] Date of Patent: Feb. 26, 1991

[54] MECHANISM FOR PREVENTING INADVERTENT CHUCK RELEASE

[76] Inventor: Florian I. Nowak, 16 Dean Dr., Newington, Conn. 06111

[21] Appl. No.: 461,808

[22] Filed: Jan. 8, 1990

[51] Int. Cl.⁵ .............................................. B23B 31/20
[52] U.S. Cl. .................................. 279/1 C; 279/1 F; 279/50
[58] Field of Search ................... 279/1 C, 1 F, 1 ME, 279/50, 51, 57, 58

[56] References Cited

U.S. PATENT DOCUMENTS

| 2,400,183 | 5/1946 | Wilson | 279/50 |
| 2,495,050 | 1/1950 | Banker | 279/51 |
| 2,610,065 | 9/1952 | Banker | 279/23 |
| 3,292,939 | 12/1966 | Lorenz | 279/50 |
| 3,625,528 | 12/1971 | Sage | 279/51 X |
| 3,709,508 | 1/1973 | Dudley | 279/1 |
| 4,014,558 | 3/1977 | Brinkman | 279/50 |
| 4,347,753 | 9/1982 | Claussen et al. | 74/110 |
| 4,418,925 | 12/1983 | Nowak | 279/50 |

Primary Examiner—Steven C. Bishop
Attorney, Agent, or Firm—Ira S. Dorman

[57] ABSTRACT

A collet-operating mechanism employs a plurality of locking pins which, under centrifugal forces generated during rotation of a machine spindle, engage an element of a slidably mounted collet-operating member to maintain the collet in closed condition.

8 Claims, 3 Drawing Sheets

MECHANISM FOR PREVENTING INADVERTENT CHUCK RELEASE

BACKGROUND OF THE INVENTION

The collet used to secure the work in an automatic bar machine, screw machine, or the like, is normally closed by effecting relative longitudinal movement between it and the spindle within which the collet is coaxially mounted. The means that is provided for impressing the force necessary to either slide the spindle over the collet, or to pull the collet into the spindle, is called the "collet closing mechanism." For many years such mechanisms have most commonly comprised an arrangement of chuck levers mounted in a chuck lever fulcrum. Because of structural constraints and the magnitude of forces involved, however breakage has been common in such closing mechanisms and attendant risks to personnel and damage to machinery have been substantial.

Other designs for collet-closing mechanisms have of course also been proposed and adopted. The so-called "ball-chucker" system, for example, utilizes a circular array of ball bearings assembled in a cage behind a displaceable thrust collar. An external, slidably mounted sleeve moves over the ball bearings, forcing them inwardly against the thrust collar to thereby shift it in one direction or the other; this motion is transmitted by appropriate means to effect closure of the collet.

While devices of the kind described may offer advantages over the earlier, lever-operated mechanisms, still they are seriously deficient in certain respects. In particular, because they are subject to extreme wear on mating surfaces, due in part to the minimal areas of contact provided by the spherical bearings employed, the useful life of such mechanisms is relatively short and their practical value is limited.

A collet-operating mechanism that substantially avoids such disadvantages is described and claimed in Nowak; U.S. Pat. No. 4,418,925, issued Dec. 6, 1983. In accordance with the invention described therein an array of wedge members is employed as the force-transmitting means, thus providing extensive areas for contact with the associated bearing surfaces.

Despite the effectiveness and wide acceptance of mechanisms such as that of the Nowak patent, in some instances there is a tendency for the collet to open inadvertently due primarily to the effects of vibrational forces, which promote movement of the operating sleeve. Among the many sources for vibration in automatic screw machines, and the like, are mechanical looseness in spindles and drive means, imbalances in rotating components, free length harmonics set up by rotating bar stock, and cutting forces reflected back through the machine.

As will be discussed more fully below, a current practice that is employed to prevent such accidental release of a collet chuck involves the provision of a block on the machine, so located as to be abutted by the operating sleeve of the closing mechanism in its operative position, to thereby prevent inadvertent retraction. Because such blocks are subjected to constant wear, however, they must be replaced at fairly frequent intervals. Apart from matters of attendant power consumption and hardware costs, the machine down-time required for replacement represents a very significant detriment.

Accordingly, it is an object of the present invention to provide a novel collet-operating mechanism which is inherently adapted to effectively maintain the collet in closed position, and which will readily permit release, as desired.

It is a more specific object of the invention to provide such a mechanism in which the forces inhibiting opening automatically increase with the speed of rotation, thereby affording effectiveness related to dynamic demand.

Other specific objects are to provide a mechanism having the foregoing features and advantages, which is also of relatively uncomplicated design and construction, which affords a long useful life, which is highly effective for its intended purposes, and which is relatively economical and facile to manufacture.

SUMMARY OF THE INVENTION

It has now been found that the foregoing and related objects of the invention are readily attained by the provision of a collet-operating mechanism, including: a first part having a longitudinal axis of rotation; a collet-closing member slidably assembled with the first part for limited relative axial movement; force transmitting means, operatively interposed between the first part and the closing member, for effecting such relative axial movement in one direction; and an operating member slidably assembled with the first part and the closing member for axial movement between first and second positions. The operating member is disposed outwardly of either the first part or the closing member, or both; in its "first" position it acts upon the force-transmitting means so as to effect the relative movement referred to hereinabove, to there by close an operatively connected collet; in its "second" position the operating member permits such relative movement in the direction opposite to the "one" direction, to permit the collet to open.

The operating member of the mechanism has means defining an inwardly opening recess portion thereon, and including at least one engagement element. Either the "first" part or the closing member, as appropriate, has a circumferential outer surface portion which is disposed proximate the recess-defining means of the operating member, and which carries a plurality of engagement components. The latter are movable, n axes oriented radially with respect to the axis of rotation, alternatively between withdrawn and extended positions disposed, respectively, inwardly of the circumferential surface portion of the "first" part or the closing member, as the case may be, and in protrusion therebeyond. The recess portion and the engagement components are so configured and positioned that the engagement components can, in their extended positions, partially enter the recess portion and engage the engagement element thereof, so as to inhibit movement of the operating member from its "first" position toward the "second" position thereof. As a result, centrifugal forces generated by rotation of the mechanism can act upon the engagement components to cause them to assume and maintain extended positions, to thereby produce the desired interengagement and inhibition to movement of the operating member toward the open position of the collet.

Generally, the collet-closing member will have a cylindrical wall portion that is slidably mounted upon the first part, providing the cylindrical outer surface defined through which extends radially a plurality of apertures. One of the engagement components is disposed in each aperture and is maintained against outward movement beyond a given point by cooperating means provided thereon and on the wall portion of the closing member.

The engagement components will preferably be in the form of pins slidable seated in the associated apertures, and each pin will most desirably comprise a cylindrical stem having a circumferentially chamfered tip element on one end and an enlarged head element on the other the head element cooperating with the surface element of the wall portion surrounding the associated aperture to provide the movement-limiting means. Three engagement components, seated in apertures that are equiangularly spaced from on another about the wall portion of the closing member, will often be found to produce an optimal balance of operating characteristics.

In more specific embodiments, the "first" part of the mechanism will comprise a supporting sleeve member adapted for mounting upon a machine spindle, and the mechanism will additionally include a flange portion extending circumferentially about the sleeve member and fixed thereon against axial movement in at least the "opposite" direction, the flange portion having an annular bearing surface on the face thereof that is oriented toward the "one" direction. The collet-closing member in such an embodiment will additionally have a generally annular bearing surface disposed in confronting relationship to the flange portion bearing surface, and at least one of the bearing surfaces will be of generally frustoconical configuration so as to cooperatively define a inwardly tapered circumferential channel therebetween. The force-transmitting means employed in such a mechanism will most desirably be provided by a multiplicity of wedge members disposed in a circular array for radial movement within the channel defined between the collet-closing member and the flange portion, each wedge member having a cross-sectional configuration that conforms substantially to that of the channel and having bearing surfaces on the axially lateral and radially outward faces thereof. The operating member employed will be slidably mounted on the supporting sleeve member, and will have a sidewall portion that extends over the outward faces of the wedge members.

Also, in the more specific embodiments, the recess-defining means will normally constitute the inside surface of the sidewall portion of the sleeve member, and will define a compound circumferential recess therewithin comprised of a relatively large radius forward section, a relatively small radius rearward section, and a transition section therebetween, the require engagement element being disposed at the forwardmost end of the compound recess, bordering the forward section thereof. In the "second" position of the operating member the forward section of the recess will be disposed over the circumferential channel, and in the "first" position thereof the rearward section of the recess will be so disposed. The relatively large dimension of the forward section of the recess will permit the wedge members to assume radially outward positions within the channel when the operating member is in its "second" position. When it is in its "first" position the relatively small dimension of the rearward section will force the wedge members to radially inward positions, causing them to act upon the bearing surfaces of the flange portion and the closing member so as to shift the latter in the "one" direction. Generally, the frustoconical bearing surface will be provided on the flange portion of the mechanism, and the bearing surface of the closing member will be substantially planar.

DETAILED DESCRIPTION OF THE ILLUSTRATED EMBODIMENT

Figure 1:
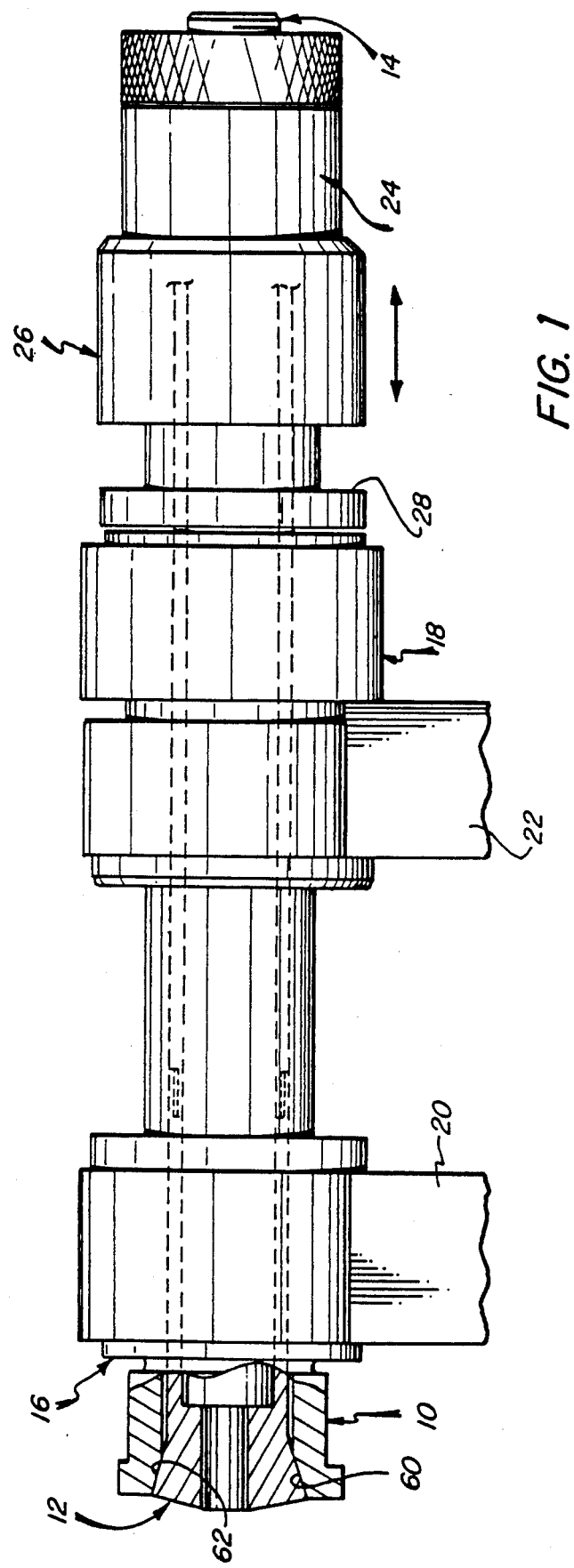
FIG. 1 is a fragmentary elevational view showing the mechanism of the invention installed in a machine and operatively connected to a collet.

Turning now in detail to the appended drawings, FIG. 1 depicts a spindle assembly of a kind that is typically employed in an automatic screw machine, incorporating a collet-operating mechanism embodying the present invention. It includes a spindle, generally designated by the numeral 10, within which is disposed a collet, generally designated by the numeral 12, and a threadably engaged, coaxial draw tube, generally designated by the numeral 14. The spindle 10 is rotatably mounted in bearing assemblies, generally designated by the numeral 16 and 18, which are supported in frame portions 20 and 22, respectively.

The collet-operating mechanism includes a pressure collar, or collet-closing member, generally designated by the numeral 24, and an operating member or outer housing, generally designated by the numeral 26, slidably mounted for reciprocal movement over the pressure collar 24. Such movement is transmitted through a machine-driven actuating shoe (not shown), having a collar part seated within the circumferential channel 28 formed into the outer housing 26.

With more specific reference now to FIGS. 2-5, it can be seen that the mechanism includes an inner sleeve, generally designated by the numeral 30, and a wedge wear ring 32 mounted upon a reduced-diameter forward portion 34 and abutted against a collar portion 36 thereof; it also includes a set of force-transmitting wedges 38 and three holding pins, each of the latter being generally designated by the numeral 40. The inner sleeve 30 is mounted upon the spindle 10, and is secured in position by tightening of the clamp screw 42 that passes secantally through the enlarged diameter wall portion 44 thereof.

The inside surface of the outer housing 26 is machined to provide a compound recess, disposed adjacent the cylindrical bearing surface 46 by which the housing is slidably supported upon the well portion 44. The recess consists of a relatively small diameter inner section 48, a relatively large diameter outer section 50, and a flared transition section 52 therebetween; a shoulder 54 lies contiguous with the large diameter section 50 at the outer end of the recess.

Figure 2:
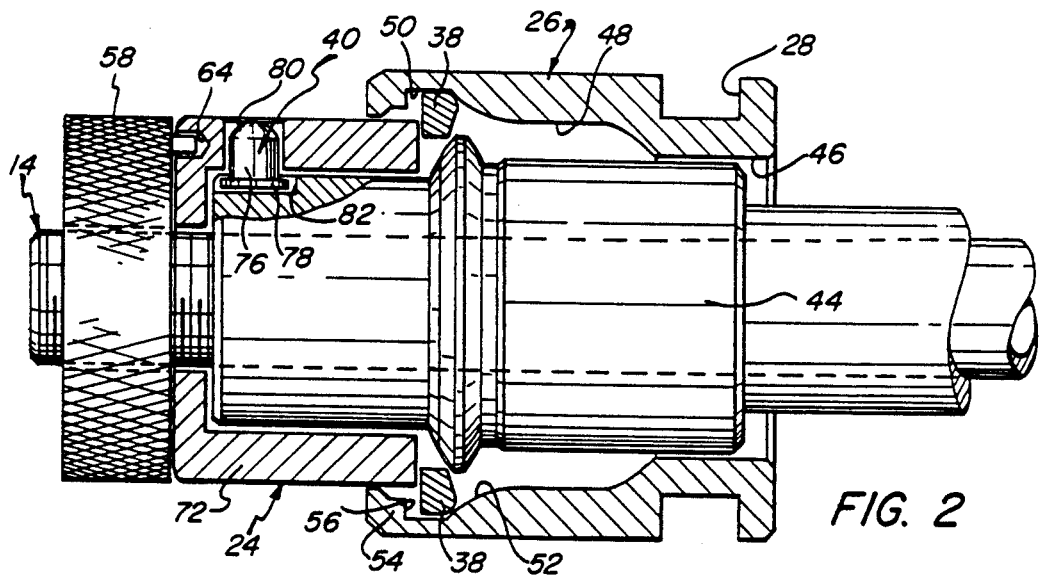
FIG. 2 is a sectional view showing the mechanism of the invention mounted upon a rotatable machine part and in condition for permitting the operatively connected collet to assume an open position, the depicted engagement component being disposed in an inoperative, rest position.
Figure 3:
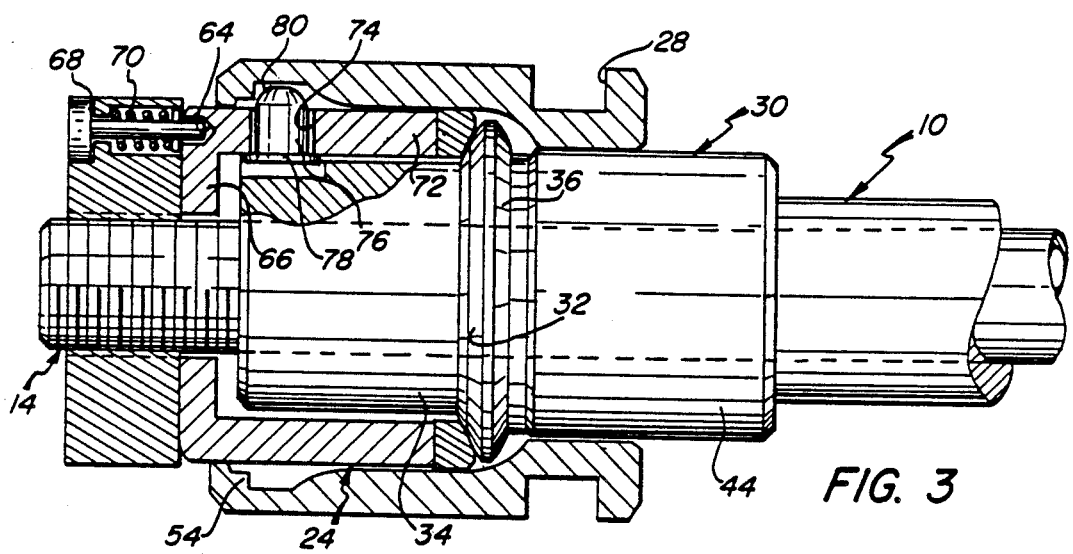
FIG. 3 is a view comparable to FIG. 2, showing the mechanism in condition for closing the collet and showing the engagement component in an outwardly protruding position.

As will be appreciated shifting of the outer housing 26 from the position shown in FIG. 2 to that of FIG. 3, so as to dispose it over the pressure collar 24, will force the wedges 38 into the tapered channel formed between the confronting faces of the wear ring 32 and the pressure collar 24. This will effect a slight axial shifting of the pressure collar 24 to the left in FIGS. 2 and 3, in turn shifting the nut 58 and the threadably attached draw tube 14 in the same direction. As a result, the collet 12 will be retracted into the spindle 10 (moving to the right in FIG. 1, the orientation thereof being inverted from that of FIGS. 2 and 3), thereby causing compression of the collet elements by virtue of coaction of the mated tapered surface 60, 62 on the spindle and collet, 10, 12, respectively.

It will be noted that a ring of small sockets 64 are formed into the angular flange portion 66 on the end of the pressure collar 24, and that the nut 58 carries a locking pin 68, which is seated within an axially extending aperture and is biased, by spring 70, toward the pressure collar 24. Turning of the nut 58 on the threaded end portion 72 of the draw tube 14 will of course slightly change the axial position of the tube relative to the collet 12, thereby enabling ready adjustment of the level of gripping force applied to the work upon actuation by the operating mechanism. The spring-biased pin 68 will of course engage within any one of the sockets 64 that is brought into alignment with it, to thereby maintain the nut 58 in any selected position: the pin 68 can of course readily be retracted for facile adjustment.

Three apertures 74 (only one of which is visible in the figures) are formed at equiangularly spaced locations about the cylindrical sidewall portion 72 of the pressure collar 24, in a common plane perpendicular to the axis thereof. One of the holding pins 40 is disposed in each aperture 74; because the diameter of the shaft portions 76 is slightly smaller than the diameter of the apertures, the pins can slide freely therein with minimal "play," and a head portion 78 on each keeps it from disengagement in a radially outward direction. Disengagement in the opposite direction is prevented by abutment of the pins 40 against the surface of the reduced diameter portion of the inner sleeve 30, into which longitudinally extending slots 82 are formed to accommodate the head portions 78 thereof.

It will readily be appreciated that the pins 40 will lie fully beneath the outer surface of the cylindrical wall portion 72 of the pressure collar 24 when the machine spindle is at rest, or is rotating at a relatively slow rate of speed, and will not therefor interfere with movement of the outer housing 26. High-speed rotation of the spindle 10 will however cause the pins 40 to shift outwardly, due to the centrifugal forces that are generated, causing the tip portions thereof to protrude beyond the surface of the wall portion 72. When such operating conditions exist the outer housing 36 will of course be positioned so as to close the collet, as depicted in FIG. 3. The outward shifting of the holding pins 40 will cause the chamfered surfaces 80 thereof to align axially with the shoulder element 54 on the lip of the housing 26, thereby preventing its displacement to the open position of FIG. 2. The collect is thereby maintained against inadvertent release, in accordance with the objectives of the invention.

It will also be appreciated that the level of resistance to opening will depend not only upon the mass of the holding elements, but upon the speed of rotation of the spindle, as well. This is of course highly desirable, due to the correlation that exists between the speed of operation and the potential risk that inadvertent opening would entail.

The pins 40 represent a preferred form of holding elements for a number of reasons. First of all, they readily permit maximization of mass, and thereby of holding power. Secondly, the holding effect of such pins can be modified simply by varying the angle of the circumferential chamfer 80 on their tip portions. Because the shank portions 76 of the pins are cylindrical, moreover, they can conform closely to the aperture-defining surfaces over virtually their entire lengths, thereby affording an optimal balance between freedom of movement and stability, while minimizing wear of the parts. And finally, the use of such pins enables the apertures in which they are seated to be of straight-through form, thereby making them relatively facile and inexpensive to produce.

Despite the foregoing, the locking components may take other forms, such as that of a spherical bearing seated within a semi-blind aperture (that is, an aperture partially closed by a surrounding lip to prevent escape of the ball). It will be appreciated that it may be advantageous to utilize more than three locking elements, and/or to utilize a combination of different forms of components. These alternatives are of course within the scope of the present invention.

Figure 4:
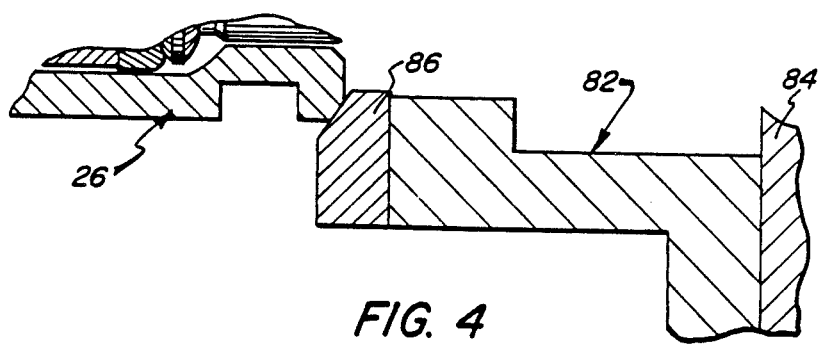
FIG. 4 is a fragmentary sectional view illustrating prior art means for maintaining a collet-operating mechanism in closed position.
Figure 5:
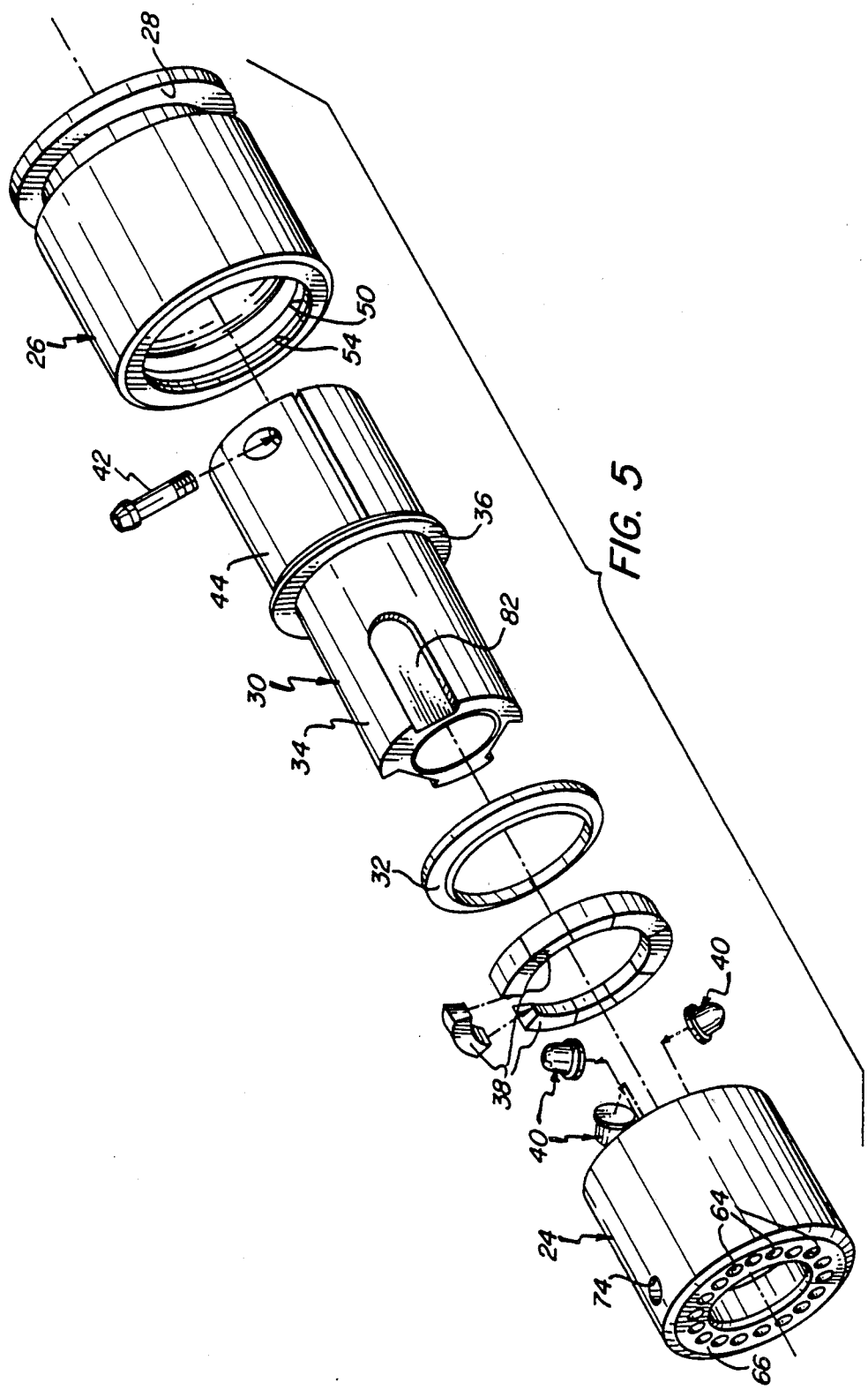
FIG. 5 is an exploded perspective view of a collet operating mechanism embodying the present invention, with associated supporting parts.

Turning finally to FIG. 4 in detail, the arrangement schematically depicted therein shows a conventional way by which the outer housing of a collet closing mechanism has heretofore been held in closed position. As can be seen, the arrangement comprises a block, generally designated by the numeral 82, affixed to the frame 84 of the machine and having a wear-resistant bearing element 86 extending along a lateral face thereof. When the machine turret turns to a position in which a mounted collet is to be closed and operational, the trailing edge of the outer housing of the associated closing mechanism is so disposed as to bear upon the wear element 86, which holds the housing in place by simply blocking its axial movement until the revolving head indexes to the next position.

While a block such as 82 will advantageously be present on a machine in which the mechanism of the present invention is employed, its function would become one of protecting against catastrophic failure, rather than of serving as the means by which the housing is normally held in position. In association with the present mechanism, such a block would seldom if ever actually contact the outer housing, or any other component of the closing mechanism.

It goes without saying that variations can be made to the mechanism of the instant invention without departure from the concepts hereof. For example, instead of providing the seating apertures and holding elements in the closing member 24, as illustrated, they might in some instances desirably be provided in another part over which the outer housing 26 slides, such as the enlarged diameter portion 44 of the inner sleeve 30. Additional modifications will readily occur to those skilled in the art.

Thus, it can be seen that the present invention provides a novel collet-operating mechanism that is inherently adapted to effectively maintain the collet in closed position, and that will readily permit release, as desired In the mechanism of the invention the forces inhibiting opening automatically increase with the speed of rotation, thereby affording effectiveness that is related to dynamic demand, and the mechanism is of relatively uncomplicated design and construction, it affords a long useful life, it is highly effective for its intended purposes and it is yet relatively economical and facile to manufacture.

Having thus described the invention, what is claimed is:

1. In a collet-operating mechanism, including a first part having a longitudinal axis of rotation; a collet-closing member slidably assembled with said first part for limited axial movement relative thereto along said axis of rotation; force-transmitting means operatively interposed between said first part and said closing member for effecting such relative axial movement in one direction; and an operating member slidably assembled with said first part and said closing member for axial movement along said axis of rotation between first and second positions, said operating member being disposed outwardly of at least one of said first part and said closing member and acting upon said force-transmitting means in said first position thereof as to cause said transmitting means to effect such relative movement in said one direction, and permitting such relative movement in the direction opposite to said one direction in said second position thereof, whereby said closing member can effect closure of a collet operatively connected thereto; the improvement wherein said operating member has means defining an inwardly opening recess portion thereon, said means including at least one engagement element; and wherein one of said first part and said closing member has a circumferential outer surface portion thereon, disposed proximate said recess-defining means of said operating member, and has a plurality of engagement components thereon movable, on axes oriented radially with respect to said axis of rotation, alternatively between withdrawn and extended positions with said engagement components disposed, respectively, inwardly of said circumferential surface portion and in protrusion therebeyond said recess portion and said engagement components being so configured and positioned that, with said operating member in said first position and said engagement components in said extended positions thereof, said components can partially enter said recess portion and engage said engagement element so as to inhibit movement of said operating member toward said second position thereof, whereby centrifugal forces generated by rotation of said mechanism can act upon said engagement components to maintain said components in said extended positions to thereby produce such inhibition to movement of said operating member during such rotation.

2. The mechanism of claim 1 wherein said collet-closing member has a cylindrical wall portion slidably mounted on said first part, said wall portion having a plurality of apertures extending radially therethrough, and wherein said engagement components are each disposed in an associated one of said apertures, said wall portion and said components having cooperating means thereon for limiting outward movement of said components.

3. The mechanism of claim 2 wherein each of the said engagement components is a pin slidably seated in said associated aperture.

4. The mechanism of claim 3 wherein said pin has a cylindrical stem with a circumferentially chamfered tip element on the outer end thereof.

5. The mechanism of claim 4 wherein said pin has an enlarged head element on the inner end there of, said head element and the inner surface element of said wall portion surrounding said associated aperture providing said movement-limiting cooperating means.

6. The mechanism of claim 1 wherein said plurality of engagement components and apertures has a numerical value of three, and wherein said apertures are equiangularly spaced from one another about said cylindrical wall portion of said closing member.

7. The mechanism of claim 1 wherein said first part is a supporting sleeve member adapted for mounting upon a machine spindle, and wherein said mechanism additionally includes a flange portion extending circumferentially about said sleeve member and fixed thereon against axial movement in at least said opposite direction, said flange portion having an annular bearing surface on the face thereof that is oriented toward said one direction; said collet-closing member having a generally annular bearing surface disposed in confronting relationship with said flange portion bearing surface, at least one on said bearing surfaces being of generally frusto-conical configuration so as to cooperatively define an inwardly tapered circumferential channel therebetween; wherein said force-transmitting means comprises a multiplicity of wedge members disposed in a circular array for radial movement within said channel and extending about said sleeve member, said wedge members having a cross-sectional configuration conforming substantially to that of said channel and having bearing surfaces on the axially spaced lateral faces and on the radially outward face thereof; and wherein said operating member is slidably mounted on said supporting sleeve member and has a sidewall portion extending over said outward faces of said wedge members, said recess-defining means constituting the inside surface of said sidewall portion and defining a compound circular recess therewithin comprised of a relatively large radius forward section, a relatively small radius rearward section, and a transition section therebetween, said engagement element being disposed at the forwardmost end of said compound recess, bordering said forward section thereof, said forward section being disposed over said circumferential channel in said second position of said operating member, and said rearward section of said recess being disposed thereover in said first position thereof, the relatively large dimensions of said forward section of said recess permitting said wedge members to assume radially outward positions within said channel with said operating member in said second position, and the relatively small dimensions of said rearward section forcing said wedge members to radially inward positions with said operating member in said first position thereof, said wedge members acting upon said bearing surfaces of said flange portion and said closing member to shift said closing member in said one direction in said first position of said operating member.

8. The mechanism of claim 7 wherein said frusto-conical bearing surface is on said flange portion, and said bearing surface of said closing member is substantially planar.

* * * * *